United States Patent [19]
Smith

[11] 3,981,127
[45] Sept. 21, 1976

[54] APPARATUS FOR GATHERING AND CONTAINERIZING CITRUS FRUIT AND THE LIKE

[76] Inventor: Lucius N. Smith, Montverde, Fla. 32756

[22] Filed: Sept. 3, 1974

[21] Appl. No.: 502,509

[52] U.S. Cl............................................. 56/328 R
[51] Int. Cl.².......................................... A01D 51/00
[58] Field of Search.......... 56/328 R, 376, DIG. 21; 214/350–356, 518, 519, 522

[56] References Cited
UNITED STATES PATENTS

| | | | |
|---|---|---|---|
| 2,940,242 | 6/1960 | Patterson | 56/328 R |
| 3,485,026 | 12/1969 | Davis | 56/328 R |
| 3,523,404 | 8/1970 | Girardi | 56/328 R X |
| 3,608,292 | 9/1971 | Perry | 56/329 |
| 3,667,200 | 6/1972 | Pool et al. | 56/328 R |
| 3,762,140 | 10/1973 | Block | 56/328 R |
| 3,879,923 | 4/1975 | Granger | 56/328 R |

Primary Examiner—Russell R. Kinsey
Attorney, Agent, or Firm—Jennings, Carter & Thompson

[57] ABSTRACT

Apparatus for gathering from the ground oranges and like citrus fruits and for placing the same in tubs or the like. The apparatus comprises generally laterally directed conveyor-collector mechanisms each comprising chains or the like carrying groups of individually mounted gathering tines. These tines move inwardly and then upwardly, moving the fruit not only inwardly but raising it. At the top of their path of movement the fruit is discharged from the tines onto a transverse conveyor and thence onto a longitudinal extending conveyor. Receptacles, such as large tubs, are located in stacks adjacent the side of the longitudinal conveyor. Means is provided to discharge the fruit from the conveyor into a tub beneath the forward or rearmost stack and means is provided for discharging the filled tubs, laterally of the direction of the apparatus, without stopping the apparatus or its fruit gathering motions. The apparatus provides sweeper units at the ends of the collector-elevator means which go under the trees and bring the fruit on the ground thereunder inwardly into the path of the pick-up mechanisms. The apparatus is adapted to move through an orange grove or the like, completely gather the fruit and place it in containers and to discharge those containers, all without interrupting the forward motion of the apparatus and all being done by a single operator who rides the machine.

17 Claims, 26 Drawing Figures

APPARATUS FOR GATHERING AND CONTAINERIZING CITRUS FRUIT AND THE LIKE

This invention relates to apparatus for picking up citrus fruit and the like from the ground where it has fallen from the trees and for collecting the same in suitable containers for removal from the grove.

In the art to which this invention relates, fruit such as oranges, grapefruit and the like have been harvested by manually picking the ripe fruit from the trees by workers who carry bags in which the fruit is deposited. When the bag is filled the worker empties the same into a box and these boxes are picked up by a collection truck and hauled from the grove. As is known, manual picking of fruit is a laborious, expensive and time-consuming process. In the picking of fruit such as oranges it is necessary that the workers not only stand on the ground to reach the lower fruit, but also that ladders be employed to reach fruit which is too high to be reached by the worker standing on the ground. The use of ladders not only is inconvenient and dangerous, but is damaging to the trees and is clumsy and awkward. Still further, fruit has been gathered by workers who pick the same and simply drop the fruit onto the ground where it is later picked up manually. Suffice it to say, therefore, that these methods of gathering citrus fruit have left much to be desired.

In more recent times it has been proposed either to shake the fruit from the tree so that it falls on the ground or to remove it by other means such as spraying the tree with chemicals which in the art are called abscession chemicals which cause the fruit to fall from the trees onto the ground. The prime difficulty with gathering fruit by the abscession method is the present lack of suitable apparatus to travel down the rows, between the trees, to pick the fruit up from the ground, and to accumulate it in containers such as large tubs, boxes or the like.

Heretofore, various attempts employing various types of mechanisms have been made to remove fruit from the ground and to place it into tubs or the like. By way of example, one prior method known to me is the use of a machine with a plurality of rotary brushes, much like street sweeping brushes, mounted in spaced relation and driven in opposite directions. These brushes strike the fruit and windrow it toward the center. Following this machine is a wide tread tractor-drawn apparatus pulling a machine much like a potato harvester which is supposed to pick up the windrowed fruit. Such apparatus also has been equipped with a conveying means to deposit such fruit in a truck trailing the potato harvester. These machines have proven to be extremely hard on the fruit, a big percentage of it being ruptured or otherwise damaged. Furthermore, such machines as just mentioned also have the disadvantage of requiring an excessive amount of labor to operate and insofar as I am aware no suitable means has been devised to permit the machine to operate continuously, it being necessary to stop it when the truck is filled.

With the foregoing as background my invention contemplates a machine compact enough to be driven between the rows of trees such as orange trees, and to remove from the ground fruit in the random positions where it has fallen upon the ground, without the necessity of windrowing it.

More in detail, my invention contemplates apparatus of the character designated which embodies a pair of laterally directed fruit engaging and pick-up sections, thus to operate under the overhanging branches of the trees, almost up to the trunks of the trees and which shall be fully effective, with one pass down a given middle, to pick up all of the fruit on the ground in the path of the apparatus, each individual fruit being engaged by moving elements of the apparatus, which movement continues until such time as the fruit is finally deposited in a collection tub or box at the rear of the apparatus. In other words, my invention contemplates apparatus having means associated therewith which, upon engaging a fruit on the ground, moves that fruit in a substantially continuous fashion until such time as it is deposited in a collection receptacle.

More in detail, my invention contemplates pick-up mechanism for fruit on the ground which includes a multiplicity of sets of tines so shaped and arranged that as the machine moves down the middle with the tines moving generally inwardly and transversely of the direction of the movement of the machine as a whole, to engage the fruit lying at random upon the ground, move it inwardly of the path of movement of the machine, and thence upwardly, where it is eventually deposited onto a rearwardly moving conveyor which in turn discharges the fruit into suitable receptacles carried at the rear of apparatus.

A further object is to provide apparatus of the character designated in which there is means to protect against damage the certain fruit sweeping devices which are carried on the outer ends of the pick-up mechanisms in the event they encounter the trunks of trees in the grove, roots which may be growing out of the ground, or other obstructions.

A further object of my invention is to provide in combination with the pick-up mechanism apparatus for collecting the fruit in large tubs (which hold 8 to 10 boxes of oranges), these tubs being carried in stacked relationship one to another, together with means to drop them one by one from the stack, thus to be loaded with fruit from the conveyor, thus permitting the machine to continue uninterruptedly down the row between the trees.

Apparatus illustrating features of my invention is shown in the accompanying drawings, forming a part of this application, in which:

FIG. 24 is a perspective view of a portion of a modified embodiment of a collector-elevator mechanism equipped with an outer sweep and related parts having an automatic retracting and extending mechanism which is hydraulically operated, and further having means for extending the entire sweep to an extra wide position;

FIG. 25 is a perspective view of the sweep of FIG. 24 in maximum outwardly extending position; and, FIG. 26 is a view of the sweep of FIG. 24 in its minimum extended position.

Figure 1:
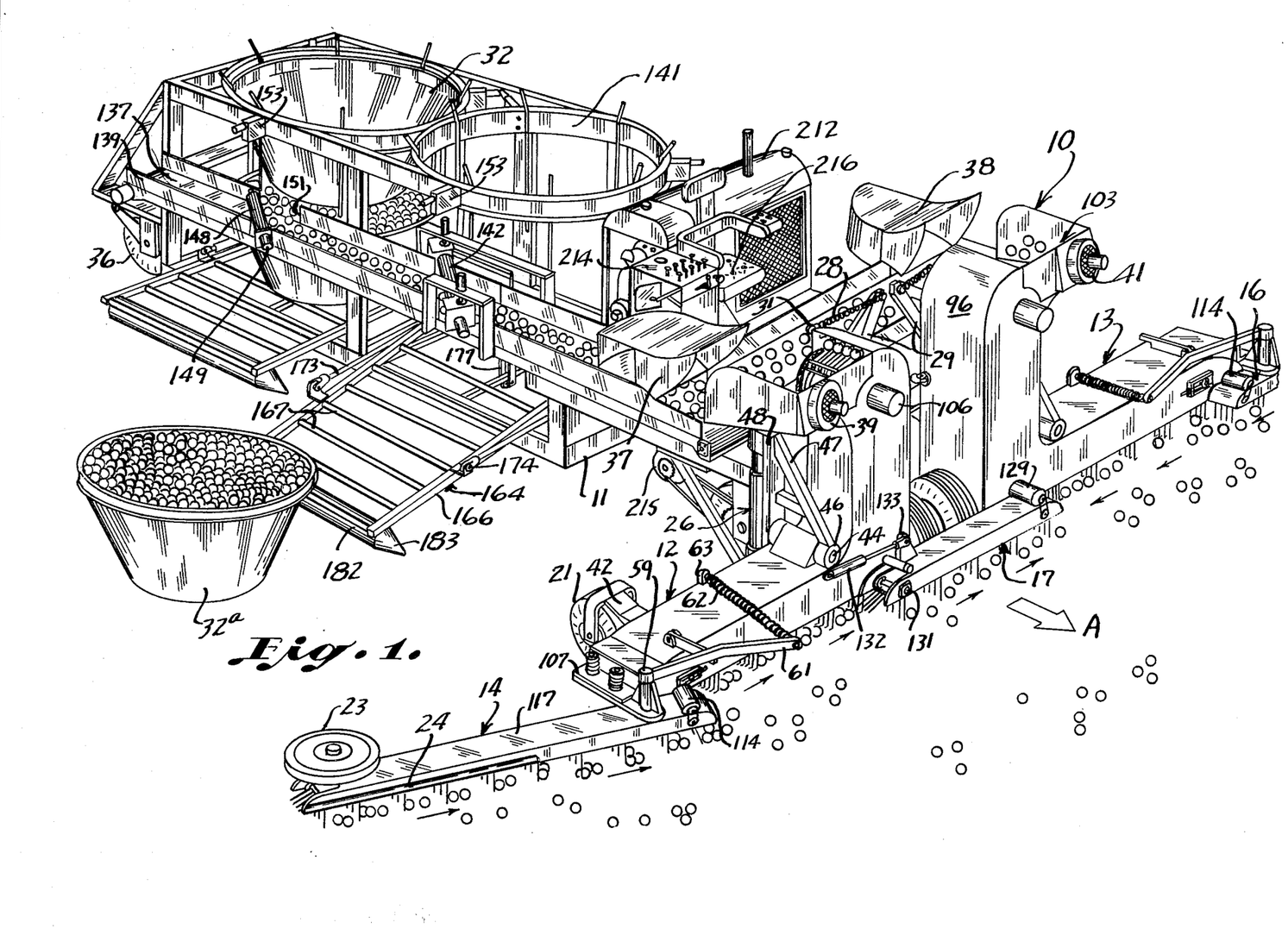
FIG. 1 is a perspective view of my improved apparatus, certain parts being broken away.

Referring now to the drawings for a better understanding of my invention, in FIG. 1 by the numeral 10 I indicate generally my improved apparatus which is designated herein as a harvester and loader-unloader. That is to say, and as before stated, the apparatus is disposed to pick up fruit from the ground, raise it, move it rearwardly and then to load it into tubs or the like, the tubs, when filled, being discharged onto the ground laterally of the path of movement of the apparatus.

The apparatus includes a main frame 11 including appropriate forwardly and laterally extending frame members, welded or otherwise secured together to form a complete, rigid supporting unit. The machine is wheel mounted and self-propelled and is adapted to move along in the direction of the arrow A, FIG. 1 as will appear.

Generally stated, the apparatus comprises a right-hand collector-elevator mechanism indicated generally by the numeral 12 and a duplicate of the same indicated generally by the numeral 13, on the left side. Both are substantial duplicates and only one will be described in detail. The right-hand collector-elevator section or unit 12 is provided with an outwardly extending sweep unit indicated generally by 14, while the left-hand collector unit is provided with a similar sweep unit designated generally by the numeral 16. At the center of the apparatus there is a sweep unit indicated generally by the numeral 17. As will appear as the description proceeds, the sweep units 14 and 16 are adapted to enter beneath the overhanging branches of trees such as orange trees and to pull the fruit lying on the ground inwardly, thus to place it in the path of the units 12 and 13, respectively, to be picked up by the latter. The sweep unit 17 may operate either to the right or to the left as the machine is viewed from the front, FIG. 1, so that any fruit lying in the path between the inner ends of the units 12–13 is moved into the path of one or the other of them, in the case indicated, into the path of the pick-up and elevating unit 13.

The collector-elevator unit 12 is provided with a wheel 18 while the unit 13 is provided with a similar wheel 19. Outboard of the wheels 18–19 are other wheels 21 and 22. The sets of wheels 18–21 and 19–22 support the respective collector elevator units at the proper elevation above the ground as will later appear.

On the ends of the sweep units 14 and 16 are wheels 23 mounted for rotation on vertical axes. It will be seen that the outer peripheries of the wheels overhang the ends of the sweeps 14 and 16 and also that the wheels are larger in diameter than the widths of the units 14–16 as the same are viewed in plan. Thus, with the apparatus moving down the middle between rows of trees, in the event a tree or other obstacle comes in the way of the ends of the units 14–16 such will be engaged by the wheels 23, causing the units 14–16 to pivot, as will later appear, preventing damage to the same. To further protect the members 14–16 I may provide rubber bumpers 24 on the leading edges of the same, as indicated in FIG. 1.

Adjacent the forward end of the main frame 11 I provide mechanisms for pivotally supporting and for raising and lowering the entire units 12 and 13 together with their respective sweep units 14 and 16. Thus, the support mechanism for the units 12–16 is indicated generally in FIGS. 1, 7 and 9 by the numeral 26 and the duplicate support for the left-hand units 13–16 is indicated generally in FIGS. 8 and 9 by the numeral 27. Springs 28 connected to brace members 29 of the mechanisms 26 and 27, at one of their ends, and to pins 31 at their other ends carried by structural parts of the collector-elevators, take some of the weight off wheels 18-19, thus in part to counterbalance the weight of the units 12-13.

As has before been mentioned, my invention is adapted to fill, in selective fashion, tubs or the like, an empty one being shown in FIG. 1 by the numeral 32 and a filled one by the numeral 32a, the latter having been discharged after being filled. Again, the details of this mechanism will be described later on.

The entire unit is supported for movement over the ground by means of sets of front wheels 33 and 34 preferably of the wide dual type as shown. At the rear, the machine is supported by a steerable dual tired wheel 36. All of the wheels are driven as will later appear.

As is known, when fruit such as oranges or the like are picked from the ground they generally are intermingled with a considerable amount of trash such as leaves, stalks of grass, sand and the like. In my improved apparatus I propose to provide means to separate such trash from the fruit. Viewing FIG. 1, I indicate at 37 and 38 what I term venturi trash eliminators. In front of the unit 37 is a fan 39 enclosed in a housing directed to blow air directly into the mouth of the unit 37. Similarly, a fan 41 is mounted to blow air directly into the mouth of the unit 38. The fruit containing trash passes through these blasts of air as the fruit drops downwardly and the trash is blown into the mouths of the units 37 and 38 and thence is directed laterally, to be redeposited onto the ground, rearwardly of the apparatus as it moves along through the grove.

Returning now to a detailed description of the units 12 and 13, the wheel 21 is be supported in a yoke 42 secured to the framework of the unit 12 whereas the wheel 22 is similarly supported in a yoke 43 in turn secured to the main framework of the unit or section 12.

Figures 6, 7, 8, 9:
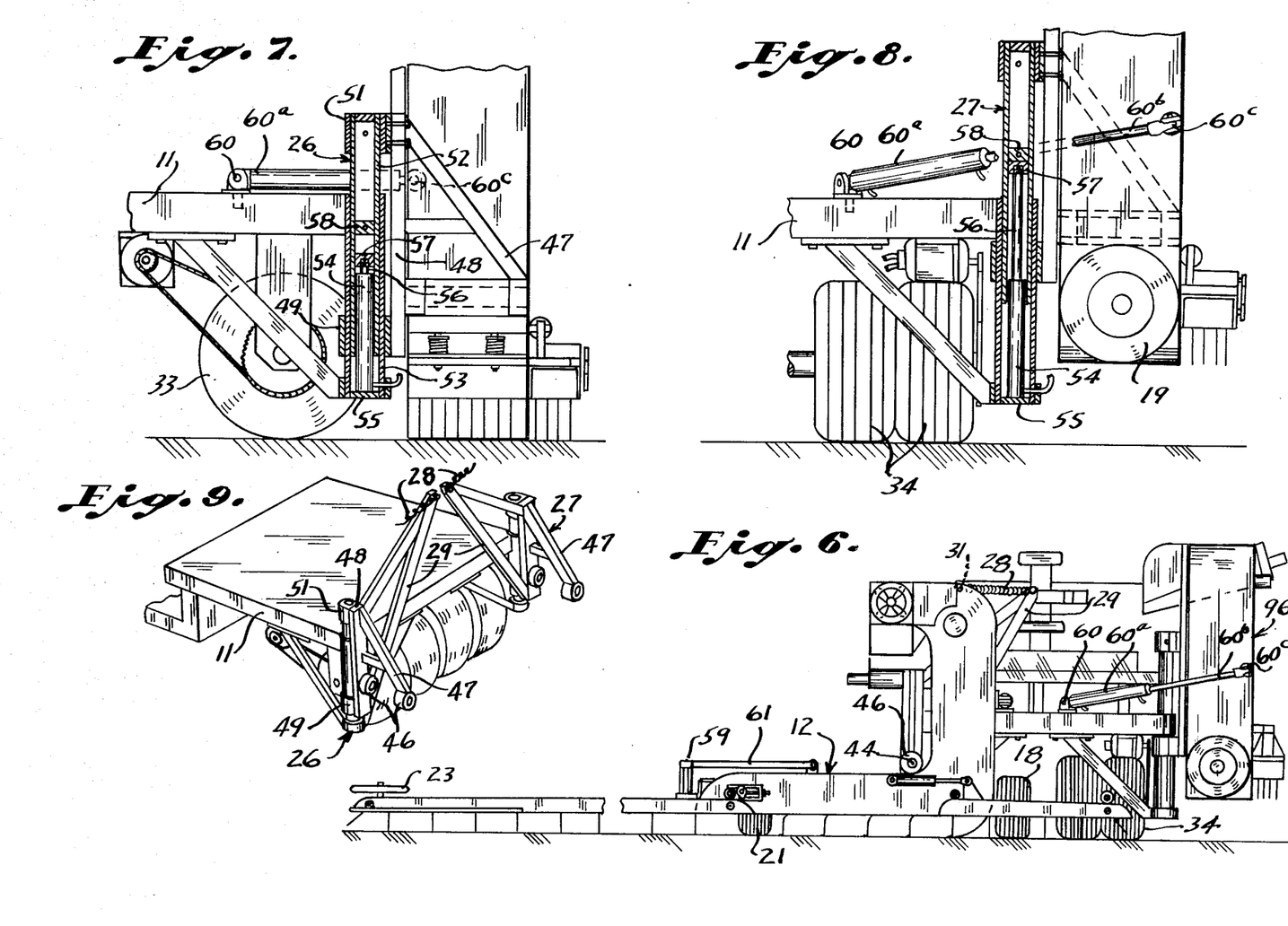
FIG. 6 is a front view showing the right side of the apparatus in harvesting position and the left side of the same in transport position, certain parts being broken away.
FIG. 7 is an enlarged fragmental detail sectional view taken generally along line 7—7 of FIG. 2 and illustrating the hydraulic lifting mechanism for the collector-elevators, the parts being in harvesting position.
FIG. 8 is an enlarged detail fragmental sectional view taken generally along line 8—8 of FIG. 2, the parts being in transport position.
FIG. 9 is a detail perspective view of the lifting and pivoting mechanism for the collector-elevator devices.

Referring particularly to FIGS. 7, 8 and 9, it will be seen that the entire units 12 and 13 are supported for pivotal movement from a position generally parallel to the direction of movement of the vehicle, for transport purposes, and also that each of them is supported for rocking movement. To this end, the unit 12 is pivotally mounted by means of a pin 44 in a pair of bearing members 46. One of the members 44 is carried on a brace member 47 and the other is carried on a vertically extending plate member 48. The plate member 48 is secured to a lower sleeve 49 and to an upper sleeve 51. The sleeve 51 in turn is secured to a vertically movable tube member 52 while the tube 49 surrounds a vertically fixed tubular member 53 inside of which the tube 52 slides.

A hydraulic cylinder 54 is mounted inside the tubular member 52 and has its lower end resting on a cross plate 55. The piston rod 56 of the hydraulic cylinder 54 carries a block 57 slidable in the tubular member 52. A block 58 is secured to the tube 52 and when the piston rod extends, block 57 contacts block 58, thus to raise the entire unit 12.

Pivoted at 60 to the frame 11 to move both vertically and horizontally is the end of a hydraulic cylinder 60a having its piston rod 60b similarly pivoted at 60c to the unit 12. Extension of the piston rod 60b causes the unit 12 to pivot from working to transport position. From what has just been described it will be seen that when fluid is admitted to the lower end of the hydraulic cylinder 54 the tubular member 52 and sleeve 51 are raised upwardly, carrying with them the plate member 48 and sleeve 49. This raises the entire mechanism attached to that part of the framework, thus to adjust the collector-elevator and its sweep relative to the ground.

When the wheel 18 contacts the ground the adjustment of the height of the inner portion of the member 12 causes the entire unit to rock about the pin 44, thus in effect obtaining a tilting adjustment of the elevating pick-up unit 12.

The support and raising mechanisms for the unit 13 is duplicated completely and in the drawings the same numbers have been applied to the same parts on the left side of the machine.

Returning again to the sweeps 14 and 16 which also are duplicates on each side of the machine, the entire unit 14 is pivotally mounted on the end of the unit 12 on a pivot pin indicated at 59 in the drawings. A lever arm 61 is secured to the pivot pin and a spring 62 has one end attached to the pivot arm and the other end attached at 63 to the framework of the section 12. Therefore, the unit 14 is spring biased forwardly at its outer end so that if the wheel 23 or any other part of the unit 14 strikes a tree or other obstruction, the same will move backwardly, thus to prevent damage. As soon as the obstruction is passed the spring returns the unit 14 to the position shown in the drawings.

Figure 10:
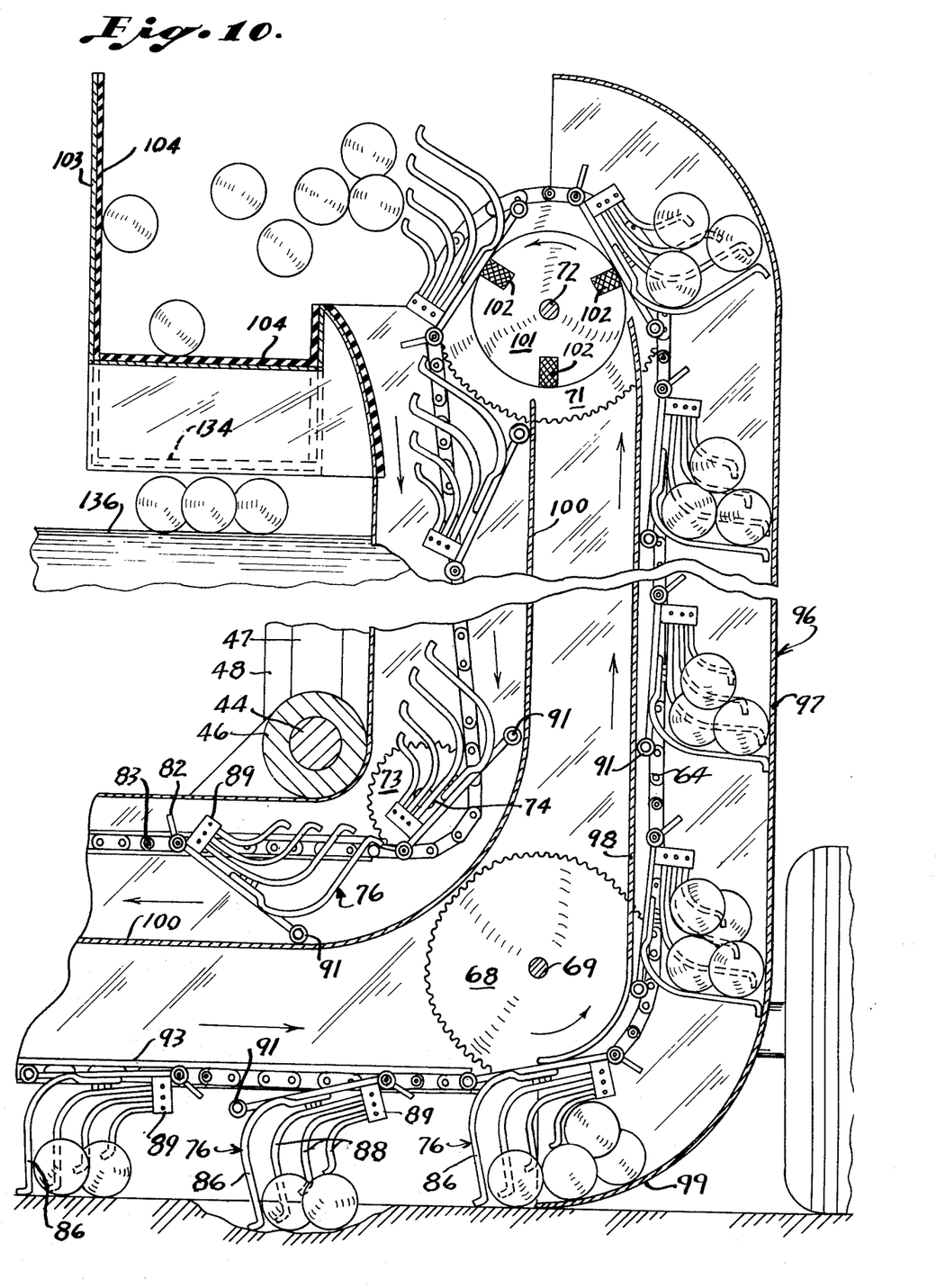
FIG. 10 is a detail sectional view of a portion of the collector-elevator mechanism taken generally along line 10—10 of FIG. 3, the view being greatly enlarged.
Figure 11:
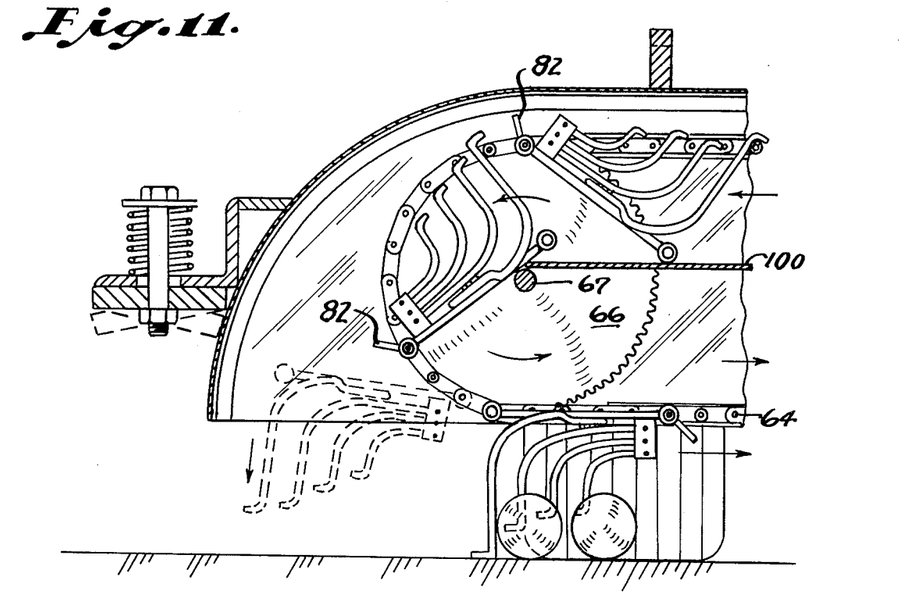
FIG. 11 is an enlarged detail fragmental sectional view taken generally along line 11—11 of FIG. 2 and showing the outermost end of one of the collector units.
Figure 12:
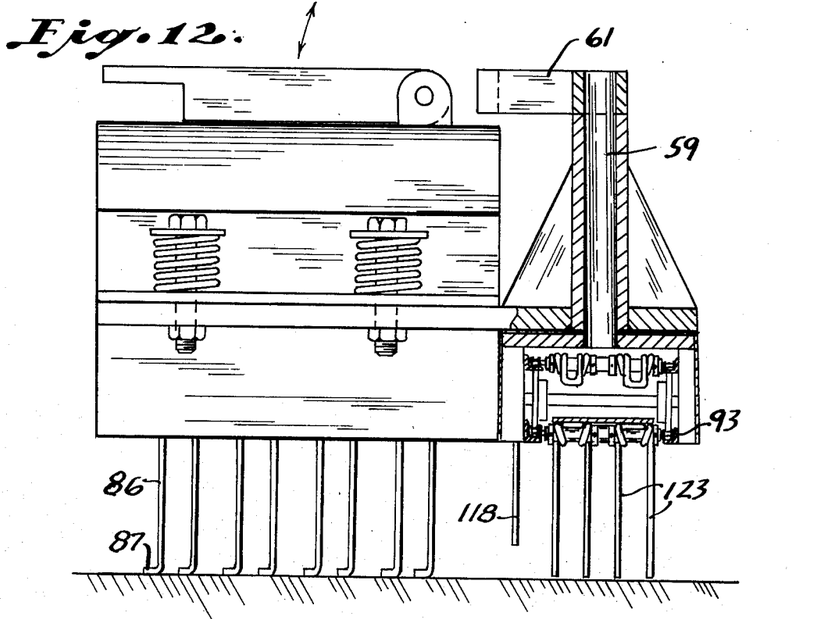
FIG. 12 is a detail fragmental sectional view taken generally along line 12—12 of FIG. 2 and showing the spring loaded hinge and pivot connecting means for connecting the outer sweep to the collector-elevator.
Figure 16:
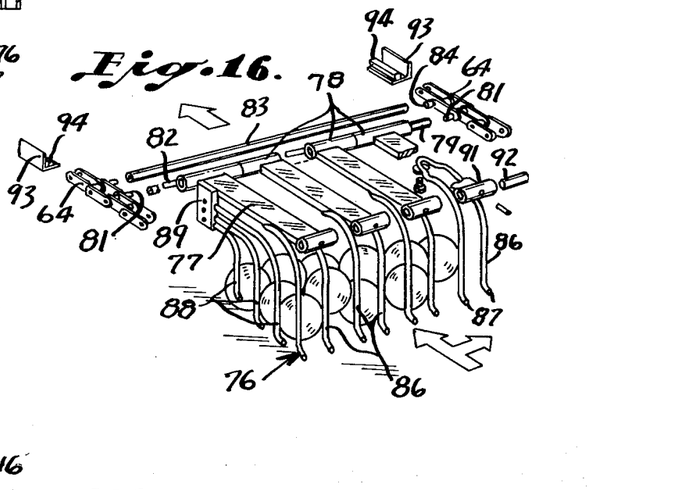
FIG. 16 is an exploded perspective view, some parts being broken away, showing the collector-elevator tines and related parts.

Referring now particularly to FIGS. 10, 11 and 16 I will now describe more in detail arrangement of the conveying and elevating mechanisms which engage the fruit upon the ground, move it inwardly of the direction of movement of the apparatus through the grove, raise it, and deposit it onto a rearwardly moving conveyor. Since, as stated, the units 12 and 13 and 14 and 16 are duplicates, a description of one will suffice for both.

First, the mechanism comprises a pair of spaced chains 64 and these chains pass over sprockets 66 mounted on a shaft 67 located at the outer extremity of the unit 12. The chains then pass over spaced sprockets 68 mounted on a shaft 69 and thence proceed upwardly where the chains pass over sprockets 71 mounted on a shaft 72. The chains then continue downwardly, as shown particularly in FIG. 10, where they pass under sprockets 73 mounted on a shaft 74, thence returning to the upper surfaces of the sprockets 66.

Mounted at intervals along the chain, so as to contact the ground when on the lower flight of chains 64 is a plurality of collector-elevator tine assemblies indicated generally in FIG. 16 by the numeral 76. Each of these assemblies includes a plurality of rearwardly extending bar-like members 77 which are secured to sleeves 78. A tube 79 passes through the sleeves 78 of each of the units as shown in FIG. 16 whereby the bars are all mounted, pivotally, for rocking movement in a vertical plane as shown in FIG. 16.

The tube 79 fits at each end in pins 81 projecting inwardly from the sides of the chains 64. Projecting forwardly and slightly downwardly from the sleeve 78 is a limiting bar 82. See also FIG. 10. These limiting bars are adapted to engage a limiting rod 83 mounted on pins 84 carried by the chains 64 whenever the units are picked completely clear of the ground, thus preventing the bars and hence the tines (later to be described) carried by them from hanging straight down when the apparatus is lifted upwardly for transport purposes.

Secured to the bars 77 at the right hand side of FIG. 16 are spring tine fingers 86. These are secured as indicated to the undersurfaces of the respective bar members 77 and are bent downwardly and have outturned, rearwardly turned (in the sense of direction of movement of the conveyor) feet 87.

The rearmost (in the sense of direction of movement of the apparatus) bar 77 is provided with tines 88 which extend downwardly as indicated, being secured to a side plate 89, thus to form the rear of a two sided, cage-like structure which engages the fruit on the ground as the apparatus moves along and as the tine units move inwardly toward the center of the machine. It will thus be seen that the tines, each set of which is carried by the individually pivoted bars 77, are free to pivot independently, but as a group are adequate to trap fruit lying on the ground and move it inwardly of the apparatus. If desired, sections of tubing indicated at 91 provided with lead weights 92 may be mounted on the outer or free ends of the bars 77, thus to add holddown force to the sets of tines.

The chains move along rails 93 and the rails may be provided with guide members 94.

As best seen in FIG. 10 the lower flight of the chain passes first under the sprockets 68 and thence moves upwardly into a chute-like housing having forward and rear walls 97 and 98. It will be seen that the wall 97 has a lower rearwardly curved end 99 so that as the fruit is moved from the ground onto such lower curved end it is effectively trapped between the wall 97 and the tines. The tines thus serve not only to move the fruit inwardly, but also lift it.

Mounted on shaft 72 is a cylinder 101 of non-ferrous material such as wood or plastic and which carries three axially elongated magnets indicated at 102. These lie at the surface of the member 101 so that as the bars 77 carrying the tines 76 move over the top of their path of movement, the bars 77 are engaged and held by the magnets 102 as shown in FIG. 10. As the tines progress over the highest point in their path, the fruit is discharged as indicated in FIG. 10 into a discharge section 103 which may be lined with soft material such as rubber or the like indicated at 104. Continued downward movement of the left-hand flight of the chain as viewed in FIG. 10 breaks the magnetic grip, permitting the tine carrying bars to move downwardly again, outwardly and then under sprockets 73, thence over sprockets 66, to begin their return fruit-engaging trip inwardly again and then upwardly. A wall 100 extends the length of the unit 12 and has a vertical section lying rearwardly of wall 98. The weighted outer ends 91 of the bars 77 ride on the wall as shown in FIGS. 10 and 11, holding the tine sets 76 in the position shown until they pass over sprockets 66.

The shaft 72 is powered by a suitable motor such as a hydraulic motor indicated at 106.

It will be understood, of course, that the pick-up mechanisms already described are duplicated at the left side of the machine. It will be noted that as the fruit drops off the tines at the upper flight of the chains the fans 39 and 41 blow air across the path of the fruit as it drops downwardly, thus blowing any trash in the same through the venturi members 37 and 38.

Figure 13:
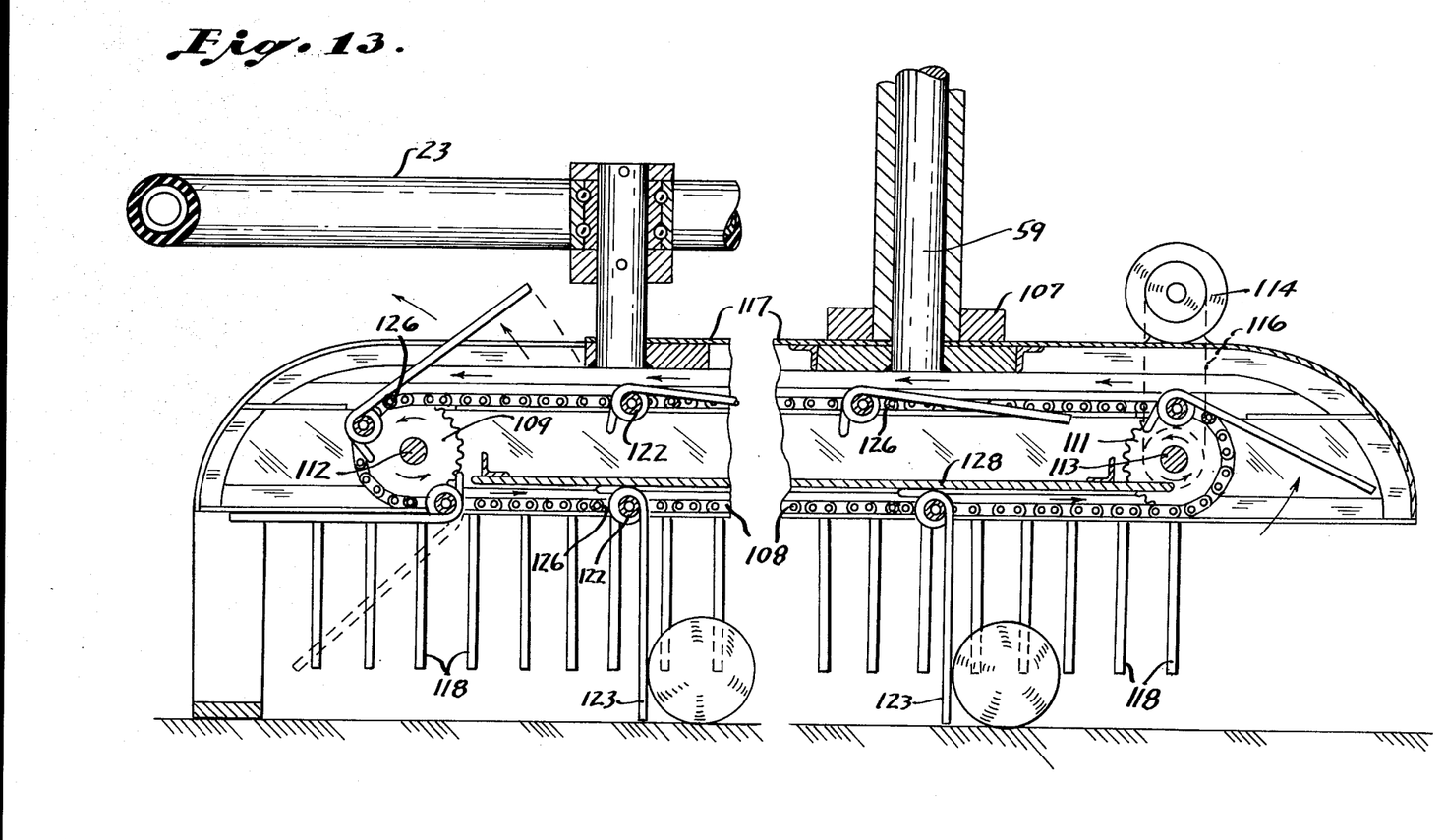
FIG. 13 is an enlarged detail fragmental sectional view taken generally along line 13—13 of FIG. 2 and showing one of the outer sweeps.
Figure 14:
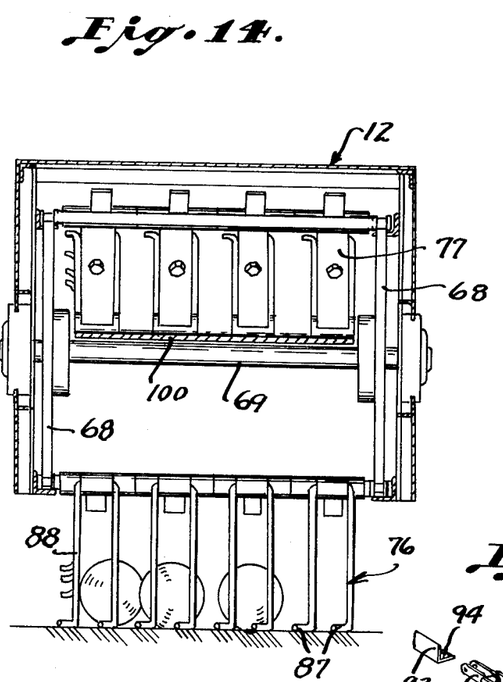
FIG. 14 is an enlarged detail sectional view of one of the collectors taken generally along line 14—14 of FIG. 2.

The outer sweep members 14 and 16 likewise are duplicates and a description of one will suffice for both. Referring particularly to FIG. 13, it will be remembered that the entire sweep is pivoted at 59 to a plate 107 carried on the outer end of the unit 12.

The sweep comprises a pair of chains 108 spaced apart to ride on spaced sprockets 109 and 111 mounted on shafts 112 and 113, respectively. The shaft 113 is driven by a hydraulic motor 114 through a chain or the like 116 in such direction that the lower flights of the chains 108 move inwardly toward the center of the apparatus.

Figure 15:
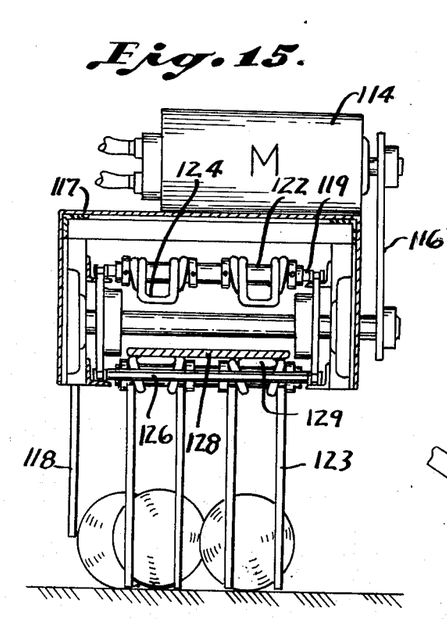
FIG. 15 is an enlarged detail sectional view taken generally along line 15—15 of FIG. 2 and illustrating some of the details of the sweeps.
Figure 17:
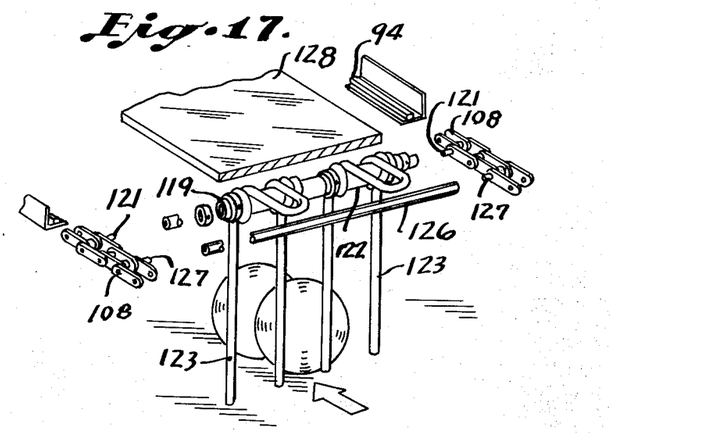
FIG. 17 is an exploded, perspective view, certain of the parts being broken away, showing the parts of the sweep tines and related mechanism.

As best shown in FIGS. 13, 15 and 17 the sweeps are mounted in inverted trough-like housings 117. Along the rear wall of the housing is a plurality of downwardly depending members 118 which may be either a solid or individual tine-like members. These members form a back wall to engage the fruit as the apparatus moves along. Secured between the chains 108 at intervals are pieces of tube 119. The tubes fit at their ends on inwardly facing pins 121 carried by the chains 108. Mounted over the tubes 119 are outer tubes 122. Rotatably mounted about the outer tube 122 are tines 123 which are bent as indicated in the drawings to provide rearwardly extending loop sections 124.

Also extending between the chains is a second, rearwardly disposed tube 126 for each set of the tines secured between the chains 108 by having its ends inserted over inwardly projecting pins 127 carried by the chains 108.

Referring particularly to FIG. 13 it will be seen that the housing 117 is provided with a plate member 128 lying just over the top of the lower flights of the chains 108. The bottom of this plate is spaced so that when the tines are on their fruit moving stroke, the ends 124 of the tines engage and slide along the undersurface of the plate 128, holding the tines 123 generally in vertical position, but resiliently so. The tubes 126 support the tines on the upper flight of the chain, that is when idling, in the position generally shown in FIG. 13, preventing their lower ends from hanging down and becoming entangled in the mechanism.

It will be understood that the central sweep 17 is constructed essentially in accordance with the sweep already described. The chains of the central sweep 17 may be driven by a suitable hydraulic motor 129. Furthermore, the entire sweep 17 may be pivoted to the unit 12 at 131. A hydraulic cylinder 132 is carried by the unit 12 and its piston rod is connected to a bracket 133 upstanding from the top of the housing of the unit 17, inwardly of the pivot 131. Thus, the outer end, namely, the end carrying the motor 129 of the central sweep 17, may be raised and lowered by means of the hydraulic cylinder 132. The height of the central sweep is adjusted along with the height of the right-hand collector-elevator unit 12 inasmuch as, as stated, the unit 17 is carried by the unit 12.

Figure 4:
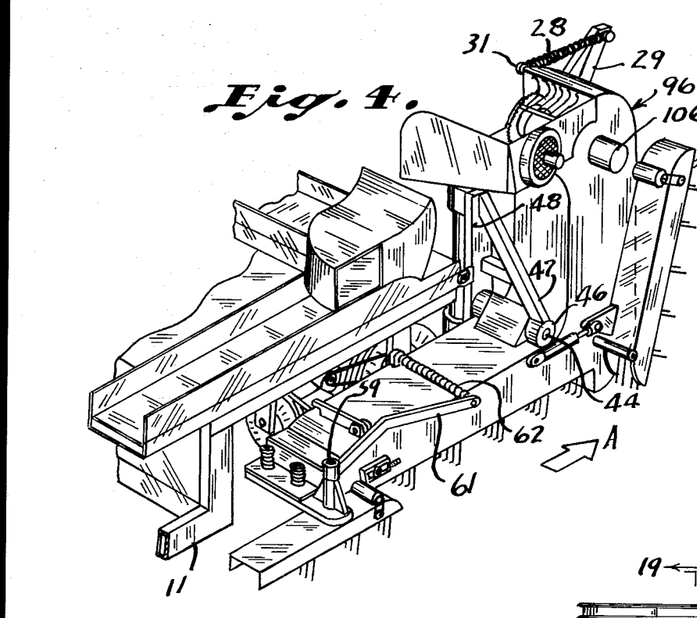
FIG. 4 is a perspective view of a portion of the right-hand side of the apparatus looking rearward, the parts being in folded, transport position.
Figure 5:
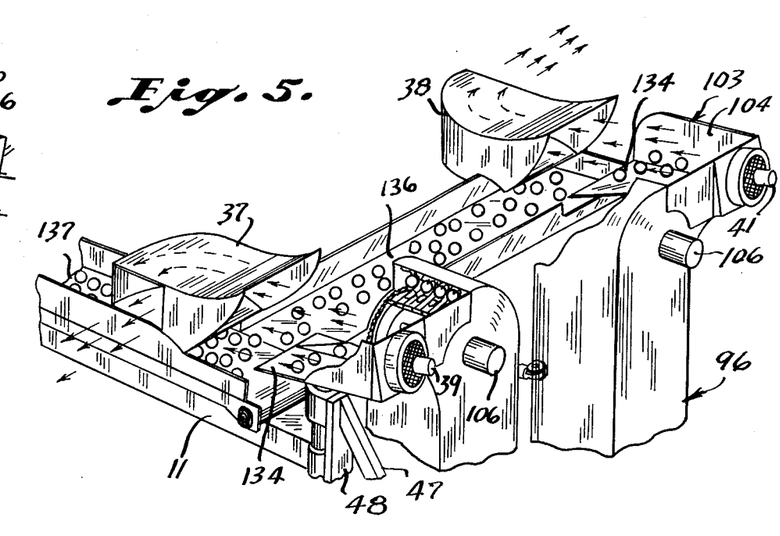
FIG. 5 is a perspective view of a portion of the upper end of the front loading system with parts broken away and showing the fans and venturi trash removers located just above the collector-elevators.

Referring now to FIGS. 4, 5 and 10, as the tine units reach the approximate position shown at the top in FIG. 10 the fruit is catapulted to the left as shown in FIG. 1, into the discharge section 103. The fruit rolls down a bottom 134 of the discharge section 103 which slopes downwardly whereupon fruit thrown onto the wall 104 rolls downwardly, coming immediately onto a transversely directed conveyor 136. As the fruit is discharged from the tines it passes through transversely directed streams of air, whereby trash is blown into and discharged from the venturi-like members 37 and 38.

The fruit is delivered by the transverse conveyor 136 onto a rearwardly moving conveyor 137. The conveyor 137 is arranged to form the bottom of a trough having an inner side wall 138 and an outer side wall 139.

Mounted on suitable framework, in tandem are circular frame members indicated at 141 which are adapted to support a plurality of nested tubs 32. In other words, in each of the circular frame-like members 141 I may place as many as twelve to fifteen large tubs each of which may hold as many as eight, ninety-pound boxes of fruit. The object is to drop these tubs, one at a time, onto the lower supporting mechanism, fill them, and discharge them sidewise relative to the direction of movement of the apparatus in the grove.

Figure 3:
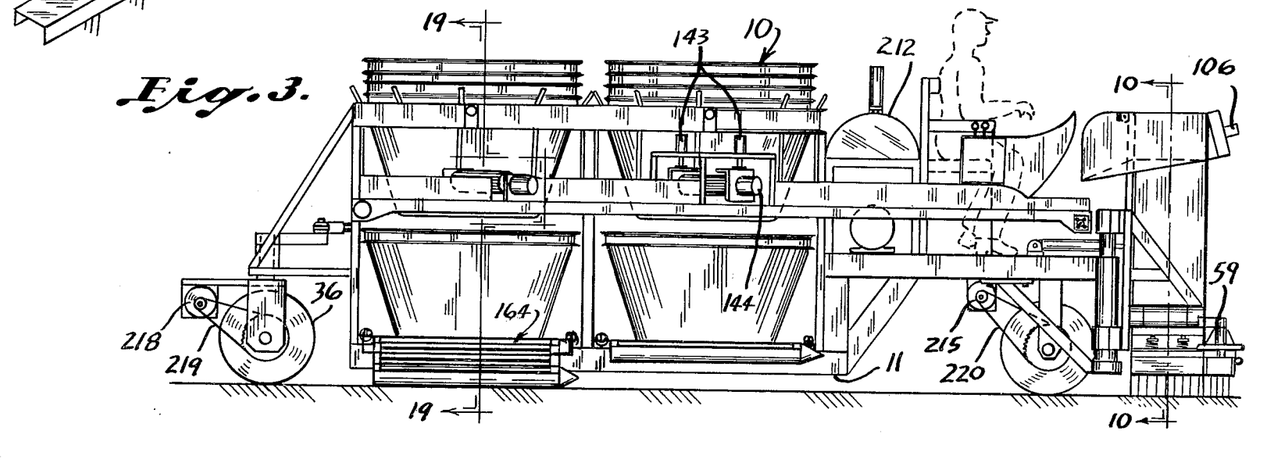
FIG. 3 is a side elevational view.
Figures 18, 21, 22:
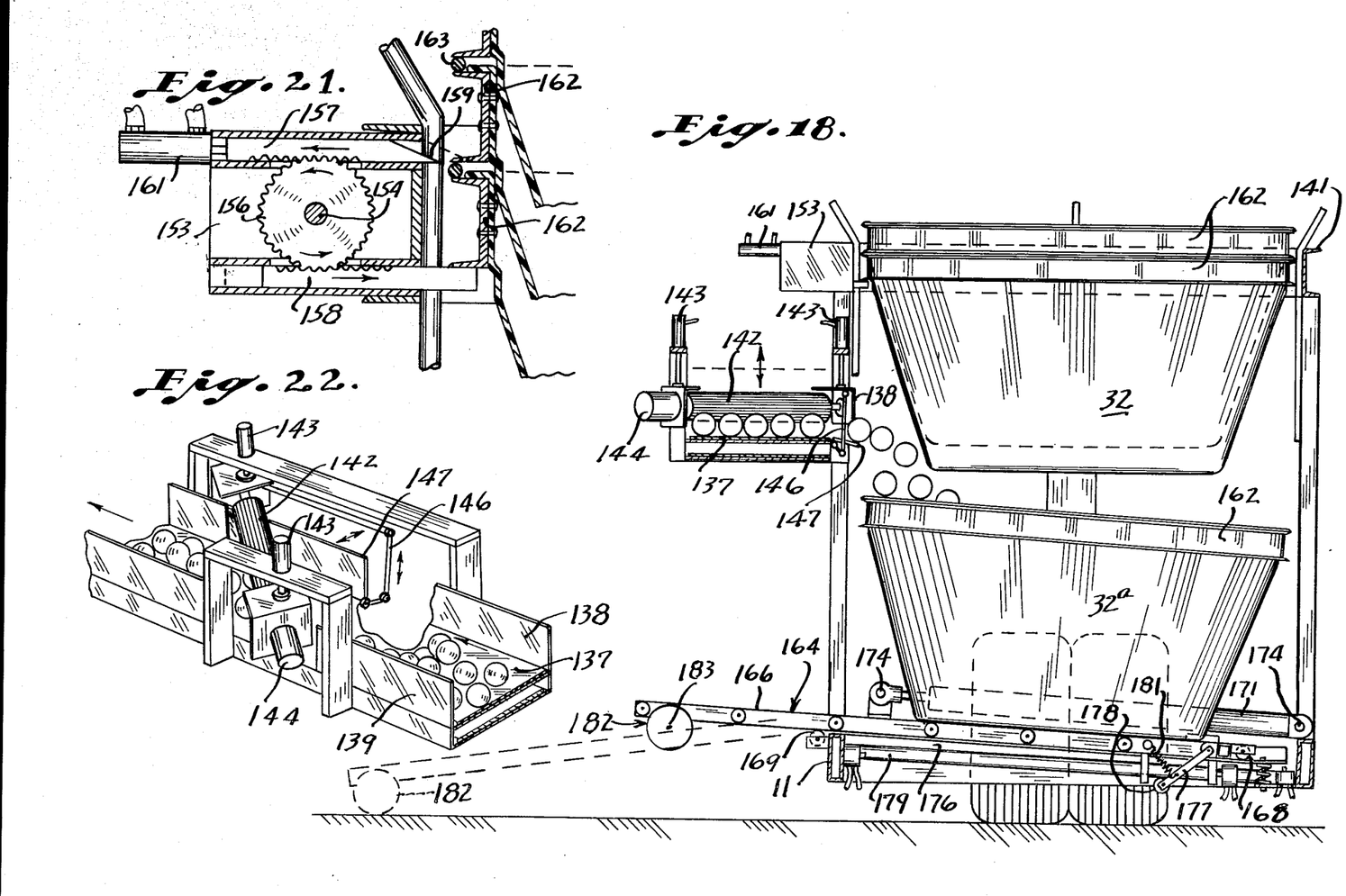
FIG. 18 is an enlarged detail sectional view of the tub loading and tub-discharge portion of the apparatus showing the parts in the fruit loading position and being taken generally along line 18—18 of FIG. 2, FIG. 18 also showing the parts in the position for the rotating brush-off and loading gate to load the forwardmost tub.
FIG. 21 is an enlarged detail sectional view of the gear box and tub escapement mechanism corresponding to FIG. 20 and showing the parts in another position.
FIG. 22 is a detail perspective view of the loading conveyor hydraulic operated rotating brush-off forward loading gate, the parts being in the up position, allowing fruit to pass under the brush-off mechanism, continuing on the conveyor to the fixed rotating brush-off mechanism.
Figures 19, 20, 23:
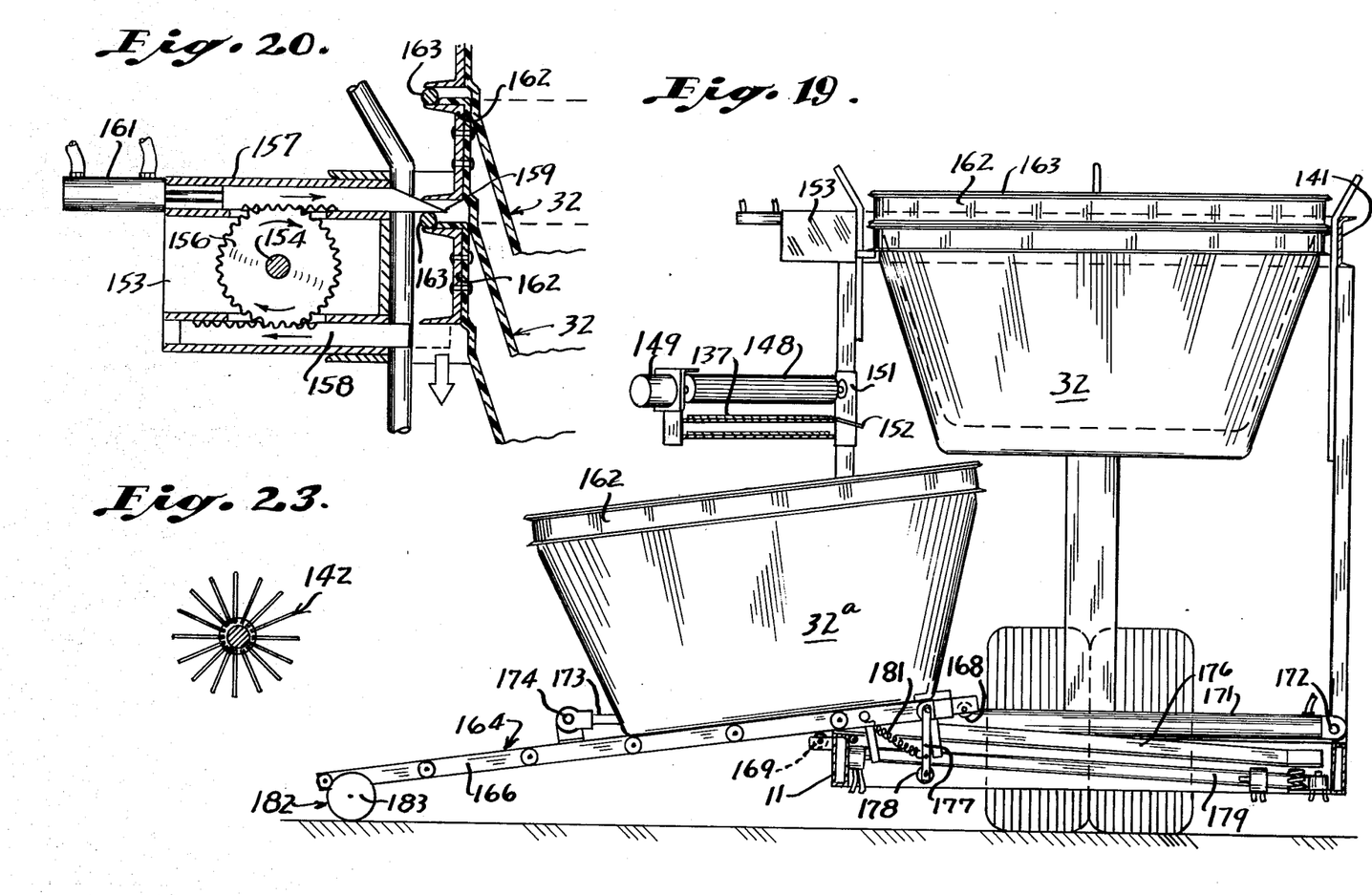
FIG. 19 is an enlarged detail sectional view of the tub holding and discharge portion of the apparatus with the parts in the tub unloading position and taken generally along line 19—19 of FIG. 3, FIG. 19 also showing the fixed brush-off and fixed loading gate for loading the rearmost tubs.
FIG. 20 is an enlarged detail sectional view of the gear box and tub escapement mechanism taken generally along line 20—20 of FIG. 2.
FIG. 23 is a detail sectional view of one of the rotating discharge brushes, the view being taken generally along line 23—23 of FIG. 2.

Referring particularly to FIGS. 3, 18 and 19 I show a lower one of the tubs 32a in FIG. 18 being filled with fruit. This fruit is being discharged into the tub 32a which is beneath the forwardmost hopper of tubs by fruit moving rearwardly on the belt 137. To this end I provide a sweep roll 142 which is adapted to lie at an angle across the upper surface of the belt 137. This roll 142 is adapted to be raised and lowered by hydraulic cylinders 143 which are connected to the supporting framework for the roll 142, the roll being driven by a hydraulic motor 144. Through the linkage mechanism indicated at 146 a gate 147 controlling an opening in wall 138 opens whenever the roll 142 is lowered to the position shown. In other words, when the cylinders 143 are actuated to lower the roll 142, through the linkage indicated gate 147 moves from the position of FIG. 22 to the position of FIG. 18, that is, from raised position to lowered position, whereupon fruit moving rearwardly on the belt 137 is shunted through the opening in the side wall 138 of the trough, thus to fall into the tub 32a which is then in fruit receiving position beneath the forwardmost stack of tubs.

At the rear of the belt 137 is a fixed transverse roll 148 driven by motor 149. The side wall of the trough has an opening 151 therein and a laterally directed section 152 is adapted to direct whatever fruit may be coming against the roll 148 into one of the tubs 32a which may be occupying a position beneath the second or rearmost stack of tubs. Thus, by actuating the cylinders 143 I can determine whether or not the fruit is discharged into the tub at the first tub station or is permitted to continue on the belt 137 to be discharged by roller 148 to a tub beneath the second tub station.

I will now describe the mechanism for permitting the escape of the tubs, one at a time, from the hoppers to fruit receiving positions. Again, both tub stations are duplicates and one only will be described in detail.

Mounted equidistantly around the framework 141 is a housing member 153. Mounted in the housing member is a shaft 154 on which is mounted a gear 156. The gear 156 engages, at its top and at its bottom, respectively, rack bars 157 and 158. The rack bar 157 has a sharp pointed, wedge-like end 159 whereas the rack bar 158 is square on its inner end.

Connected directly to the outer end of the rack bar 157 is a double-acting hydraulic cylinder 161.

The tubs themselves are provided with channel-shaped circular top sections indicated at 162 and are provided, on the horizontal flanges of the tops of these sections, with a bead-like metal member 163.

It will be noted that there are three of the units consisting of the cylinders 161, the housing 153, gears and rack bars spaced approximately equally about the perimeter of the tub supporting and dispensing mechanisms.

When it is desired to drop a tub the hydraulic cylinder 161 is actuated to a position to move the rack bar 157 inwardly from the position of FIG. 21 whereby it enters between the lower horizontal flange of the members 162 of the next uppermost tub, raising it slightly. At the same time, and after the entry of the pointed end 159 of rack bar 157 between the flanges as indicated, rack bar 158 withdraws, permitting the bottom tub to drop by gravity downwardly onto a mechanism presently to be described. As soon as the cylinder 161 is reversely actuated the bar 158 moves into position prior to the withdrawal of the pointed end of bar 157 from the flange of the uppermost tub, letting the entire stack of tubs drop down whereupon they are supported by the rack bar 158 as shown in FIG. 20, awaiting the next dropping motion.

Each of the tub sections is provided with means to support the tubs while being loaded and to discharge them laterally of the path of movement of the apparatus as it moves through the grove. It will be understood that these mechanisms beneath the tub stations are identical and hence the description of one will suffice for both.

First, each of the tub off-loading mechanisms comprises a roller bed section 164 having side rails 166 and cross rollers 167. See FIGS. 2, 18 and 19. When the tub is in fruit receiving position the parts are in the full line position of FIG. 18. The roller section is supported for reciprocation by means of rollers 168 carried at the inner ends of the roller frame sections and by rollers 169 mounted on a dropped section of the framework 11 of the apparatus.

A pair of hydraulic cylinders 171, pivotally connected to the framework of the apparatus at 172, have their piston rods 173 pivotally connected to the side frame 166 of the roller bed section as at 174.

The roller bed frame rides on the horizontal flanges of side angle members 167. Downwardly depending arm members 177 carried by the roller frame section, adjacent the inner end, carries in turn a cross roller 178. The roller 178 is adapted to contact a lower guide member 179, when the roller bed is moved to off-loading position, FIG. 19, to prevent the inner end of the roller bed from moving upwardly, when the cylinders start to return the roller bed to tub receiving position. Springs 181 hold the roller 178 in contact with the underside of member 179.

From what has just been described it will be seen that when it is desired to unload a filled tub, if it be one from the forward group of tubs, the hydraulic cylinders 143 are energized to raise the off-loading roll 142 and close the gate 147. This presupposes that there is in position on the rearmost tub section a tub 32a to receive the fruit which continues then on down the belt to be off-loaded by the roll 148. The hydraulic cylinders 171 are actuated, extending the piston rods 173 thereof and moving the entire frame carrying the loaded tub from the position of FIG. 18 to the position of FIG. 19, whereupon the loaded tub rolls by gravity down the roller bed and onto the ground.

To support the outer end of the roller bed while the apparatus is still traveling along, I provide a cone-shaped slide member 182 beneath the bottom of the outer end of the roller bed sections. That is to say, the forward ends of the cylinder-like members 182 are pointed as at 183, to prevent the ends thereof from digging into the ground.

From what has been said it will be seen that assuming, for instance, that a tub is being loaded through the gate 147, that is to load a forwardmost one of the tubs 32a, and that this tub is filled, the filled tub may be discharged and a rearmost, lowered tub may commence to be filled, without stopping the forward motion of the apparatus. A tub from either of the stacks may be dropped onto its respective conveyor mechanism 164 by the simple escapement type devices constituted by the members 157 and 158.

Figures 24, 25, 26:
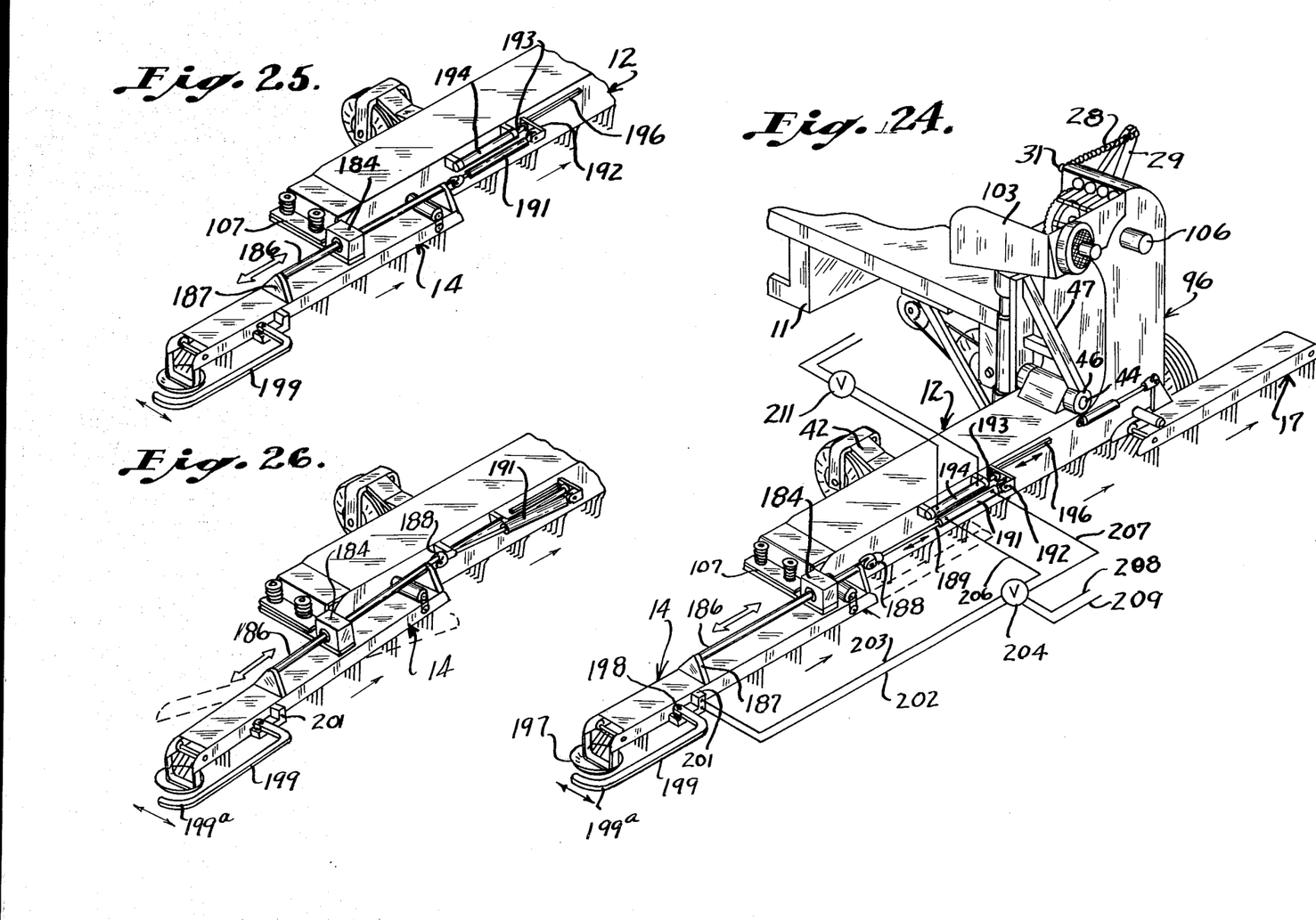

Referring now to FIGS. 24, 25 and 26 I there illustrate a modification of my improved apparatus which consists essentially of means to withdraw the sweep sections in the event they encounter an obstruction. Also, this modification permits the outward, lateral adjustment of the sweep sections, permitting them to be extended or withdrawn, proper distances, to accommodate the apparatus to passage between differently spaced rows of trees. In the drawings referred to, the various parts which are the same as those heretofore described bear the same numbers. Also, and as will be understood, the mechanism now to be described is duplicated on both sides and only the righthandside of the apparatus (from the driver's viewpoint) will be described.

The sweep section 14 is mounted for in and out movement as indicated in FIG. 24, relative to the elevating and pick-up section 12. Thus, the plate member 107 of the member 12 is provided with a bearing block 184 through which slidably passes a rod 186. The rod 186 is attached to the housing of the section 14 by means of a plate 187 carried by the housing.

Through a universal joint connector 188 the piston rod 189 of a hydraulic cylinder 191 is connected to the innermost end of the rod 186. The hydraulic cylinder is pivotally mounted to a bracket 192. The bracket 192 is in turn carried by the piston rod 193 of another hydraulic cylinder 194. Furthermore, the bracket is guided for longitudinal movement by a guide member 196 likewise carried by the framework of the section 12 and which prevents rotation of the bracket 192.

The outer end of the unit 14 is supported for sliding movement along the ground by a cup-shaped pan 197.

Pivotally mounted to the unit 14 as at 198 is an arm 199. The arm 199 has an end 199a which curves around the outer extremity of the unit 14. The arm 199 is spring biased to the position shown in FIGS. 24, 25 and 26 and it controls a hydraulic valve 201. The valve 201 may be a reciprocating pilot valve and it in turn is connected through hydraulic lines 202 and 203 to a valve 204 which controls the admission of fluid to the respective ends of hydraulic cylinder 191 through lines 206 and 207. Hydraulic fluid is supplied to and removed from the system through lines 208 and 209.

The cylinder 194 is under control of a valve 211 through the lines indicated in FIG. 24, so that the cylinder 194 may be energized to move the parts from the position of FIGS. 24 and 25 to the position of FIG. 26.

In view of the construction shown in FIGS. 24, 25 and 26 it will be seen that the sweeper unit 14 can be adjusted for total in and out movement relative to the end of the unit 12 by means of cylinder 194 and its control valve 211. At the same time, in response to the member 199 engaging an obstruction the unit 14 will move from the position of FIG. 24 to the position shown in FIG. 25 or 26, automatically. That is to say, with the unit moving to the right, as shown in FIGS. 24, 25 and 26, in the event the cam bar 199 strikes an obstruction, the lefthandmost end of cylinder 191 as shown in these figures in energized through the valve 204, withdrawing the entire unit 14 to the retracted, dotted line position shown in FIG. 24. As soon as the obstruction is passed, the bar 199 returns under its spring influence to the position shown in FIG. 24, permitting the righthandmost end of cylinder 191 to be energized, returning the parts to the position shown in FIG. 24.

Viewing FIG. 25, this Figure illustrates the parts in the position occupied with the unit 14 moved outwardly to its maximum sweep position, but with the unit automatically temporarily retracted to pass an obstacle. Thus, in FIG. 25 cylinder 194 is in position to move the unit 14 and cylinder 191 to the farthest lefthandmost position as viewed in FIG. 25. However, due to the cam bar 199 having engaged an obstruction, cylinder 191 has been activated to pull the unit 14 inwardly, that is, to the right as viewed in FIG. 25.

In FIG. 26 I illustrate the position of the parts where the unit 14, by cylinder 194, is moved inwardly, namely, to its short position. In the event the bar 199 were to engage an obstruction cylinder 191 would be activated in a direction to move the unit 14 further inwardly, thus to get out of the path of the obstruction.

As has just been described, the unit 14 and of course its counterpart on the opposite side, not shown in FIGS. 24, 25 and 26, permits the adjustment of the width of the sweep made by the entire unit through the grove and at the same time affords means automatically to retract the end units which ordinarily are under the overhanging branches of the trees, in the event of engagement by an obstruction.

Figure 2:
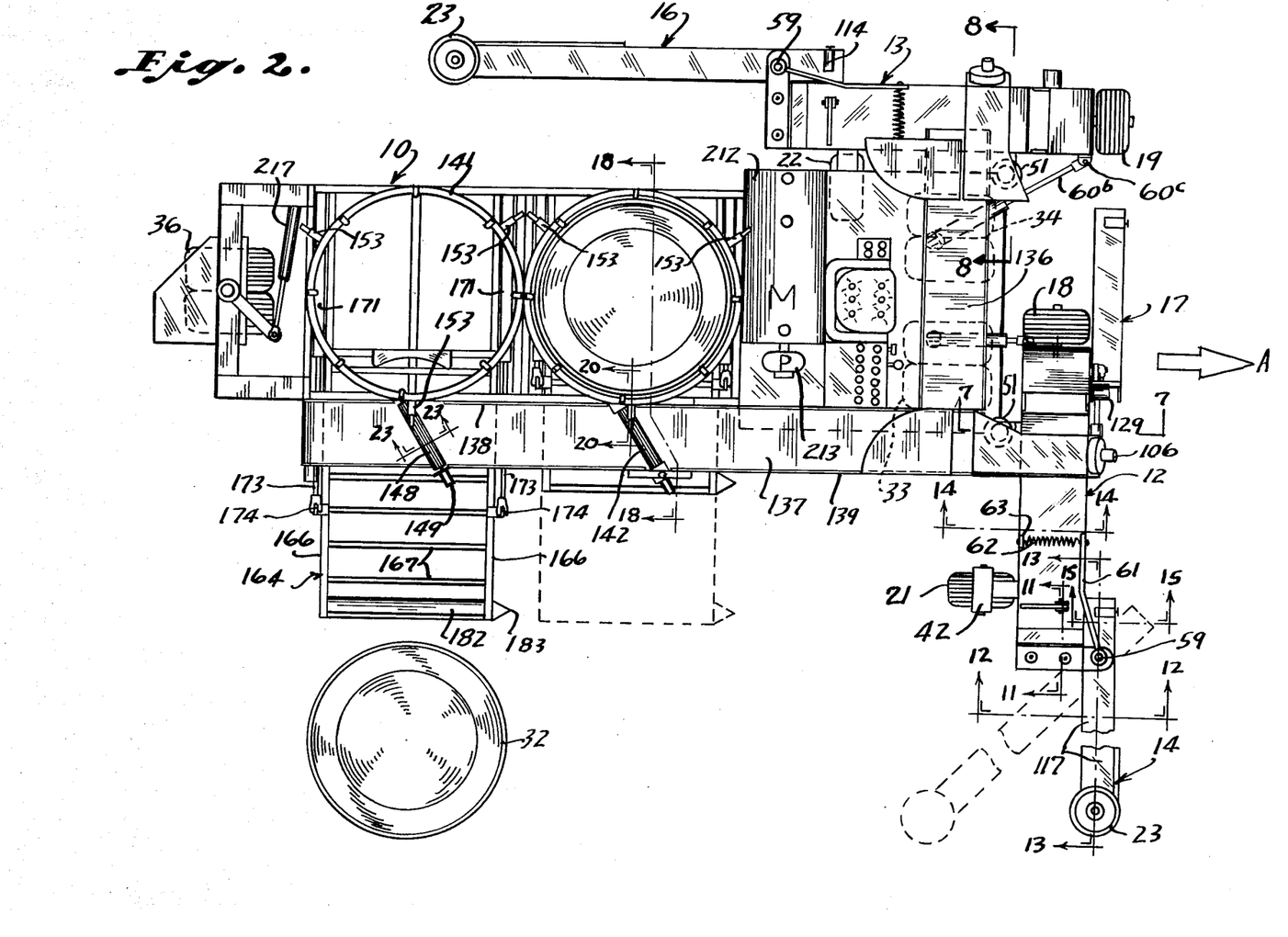
FIG. 2 is a plan view, certain parts being broken away and with the left-hand collector-elevator mechanism pivoted to inoperative, highway travel position.

Referring now to FIGS. 1, 2 and 3, it will be understood that my invention is powered from an internal combustion engine indicated in the drawings at 212. This engine drives a suitable hydraulic pump mechanism indicated at 213. A console 214 located in convenient reach of a driver's seat 216 contains all the necessary control valves for all of the mechanisms which are to be driven by hydraulic motors. The details of the hydraulic system are not illustrated inasmuch as these details are clearly within the province of those having skill in the art. Suffice it to say that the front wheels 33 and 34 are driven by a hydraulic motor 215 through suitable chains or the like 220. The rear wheel 36 is steerable by means of a hydraulic cylinder 217 and suitable linkage. See FIG. 2. Wheel 36 is driven by a hydraulic motor 218 through a suitable chain or the like 219.

From the foregoing it will be apparent that I have devised an improved, efficient and practicable apparatus for picking up from the ground fruit such as oranges, grapefruit and the like.

In the use of my invention the same is driven down between the rows of trees which as is well known, insofar as orange trees are concerned, generally have low overhanging, all around branches almost touching the ground. Therefore, it is necessary that the sweeps 14 and 16 be low enough that they can enter beneath these overhanging branches without disturbing them and still do the job at hand. With the machine moving down between the trees and with a supply of the tubs in place in their respective holders, the sweeps are operated to bring the fruit generally inwardly of the path of direction of the vehicle, as illustrated in FIG. 1. The center sweep 17 moves the fruit into the path of one or the other of the units 13 or 12, in the case illustrated being the unit 13, so that the tires of the vehicle will not run over such fruit. With the fruit thus disposed by the respective sweeps, the tines operating along and substantially in contact with the ground gather the fruit as shown in FIGS. 10 and 16, moving it inwardly until it engages the upcurving wall portion 19. There the fruit is lifted by the tines as illustrated in FIG. 10 and is thrown or dumped into the rubber-lined receiving sections 103. In view of the fact that the chains 64 are moving fairly fast, the magnetic grip on the tine units by the magnets 102 prevents the fruit from being literally thrown, too hard, in the direction shown in FIG. 10. The fruit now runs down the bottoms of the units 103 onto the transverse conveyor belt 136 and thence onto the rearwardly moving conveyor belt 137. Depending upon whether the front tub or back tub is to be filled, the fruit is discharged, respectively, by the roller mechanisms 142 or 148. When a tub is filled the operator actuates a suitable valve mechanism to energize the hydraulic cylinders 161, thus causing the sharp pointed rack bar 157 to enter between the top of the lowermost tub and the bottom of the next superjacent one, thus holding the same while the bar 158 withdraws to drop a tub to be filled onto the roller bed 164. In the case of a filled tub the operator actuates a valve to extend the piston rod of cylinders 171 to move the entire roller bed 164 outwardly of the machine, permitting the filled tub thereon to roll by gravity off the roller bed 164. It will be appreciated that the discharge of a full tob can be accomplished without stopping the forward motion of the apparatus as a whole.

The machine may be transported down the highway simply by folding the units in the manner already explained, drawing them back alongside and generally parallel with the longitudinal direction of the apparatus.

It might be noted, in passing, that any trash on the rearwardly moving conveyor 137 can be permitted to pass under the rollers 142 and 148 by having them spaced above the belt so that the trash thereof in discharged over the rearwardly end of the belt 137. With respect to trash removal, the fans 39 and 41, blowing across the path of the fruit as it is discharged as shown in FIG. 10, removes a tremendous amount of trash and blows it laterally of the machine through the venturi-like units 37 and 38.

In view of all the foregoing, it will be apparent that I have devised an improved apparatus for removing from the ground fruit such as oranges, grapefruit and the like. My machine is characterized by its simplicity of construction and by the fact that it is capable of removing substantially all of the fruit from beneath trees without damage to the same, in large quantities. Not only does my apparatus remove the fruit, but also loads the the same in large tubs and discharges these tubs, all without interruption of the gathering operation.

While I have shown my invention in but two forms, it will be obvious to those skilled in the art that it is not so limited, but is susceptible of various other changes and modifications without departing from the spirit thereof.

What I claim is:
1. In apparatus for gathering fruit such as oranges and the like lying on the ground,
 a. a wheel supported frame adapted to move alongside a row of trees from which the fruit has fallen,
 b. a laterally extending conveyor and pick-up mechanism carried by the frame comprising:
  1. a pair of spaced generally horizontal chains and the like having upper and lower flights,
  2. means to rotate the chains with the lower flights moving toward the longitudinal center line of the path of movement of the apparatus,
  3. rake-like tines carried by the chains and disposed to engage fruit on the ground and move it inwardly of the path of movement of the apparatus
  4. a vertically directed housing into which the chains carrying the fruit laden tines enter, the housing being effective to hold the fruit on the vertically moving tines, and
 c. means to discharge the thus raised fruit from the tines at a point above ground level.
2. In apparatus for removing fruit such as oranges from the ground and placing it in a container,
 a. a wheel supported main frame adapted to move between a row of trees,
 b. laterally extending fruit gathering and lifting means carried by the frame,
 c. conveyor means carried by the main frame to which the gathered and lifted fruit is delivered,
 d. containers carried by the apparatus and located in position to receive fruit from the conveyor means,
 e. apparatus associated with the conveyor means to discharge the fruit thereon into the containers, and
 f. apparatus carried by the main frame operable to discharge a filled container laterally of the path of movement of the apparatus.
3. For use in gathering and raising above ground level fruit such as oranges lying on the ground,
 a. a pair of driven, parallel, spaced endless members such as chains,
 b. means mounting said members for movement with outward portions thereof generally parallel to the ground and with inner portions thereof extending generally vertically,
 c. a plurality of sets of fruit gathering and lifting means carried by said members and disposed to engage fruit on the ground and move it parallel to the ground, and thence raise it above ground level,
 d. a vertically directed housing at least partially surrounding the vertically directed portions of said members and effective to hold the fruit on the vertically moving tines, and
 e. means to discharge the thus raised fruit from the gathering and lifting means as they pass over the upper, elevated ends of said endless members.
4. Apparatus as defined in claim 3 in which each set of said fruit gathering and lifting means comprises rake-like fingers positioned to move the fruit toward the elevated ends of said endless members and other sets of rake-like fingers located along a side of said first named fingers, whereby when translatably supported for movement over the ground the last named fingers impart a component of motion to the fruit in the direction of movement of the apparatus as a whole while the first named fingers impart to the fruit a component of motion generally normal to the path of movement of the apparatus as a whole.
5. Apparatus as defined in claim 3 in which each set of said fruit gathering and lifting means comprises a plurality of bars, means rotatably mounting each bar adjacent one end between the flights of said endless members for rocking movement in vertical planes, rake-like tines carried by each bar and downwardly extending from the free ends thereof to engage fruit on the ground, one of said bars being additionally provided with another set of rake-like tines extending downwardly therefrom to form with the first set of tines a two-sided enclosure for engaging the fruit on the ground.

6. Apparatus as defined in claim 5 in which said endless members are chains, a rotatable shaft located adjacent the vertically extending upper ends of said chains, a pair of sprockets mounted on said shaft over which the inner portions of the chains pass, the bars carrying said tines being of ferrous material, a magnet rotatably carried by said shaft and disposed to be engaged by the bars as the bars move around said sprockets, thereby to prevent said tine assemblies from swinging toward a position to discharge the fruit carried thereby with excessive force as the tines pass over said sprocket.

7. Apparatus as defined in claim 6 in which said housing has walls confining the outer ends of the up-moving tines and the open side of said two sided enclosure defined by the tines, thus to hold the fruit on the tines as it is raised.

8. Apparatus as defined in claim 7 in which the upper end of said housing is open, permitting the fruit on the tines to be discharged from the housing and the tines, and means to blow a stream of air angularly of the path of the fruit as it is discharged from the upper end of the housing, thereby to remove from the fruit trash discharged with the fruit.

9. In apparatus for removing fruit such as oranges from the ground onto which it has fallen at random from row planted trees and for placing the fruit in a container,
   a. a translatably supported driven vehicle having a frame and adapted to pass between a row of trees,
   b. a first gathering and elevating means embodying a conveyor-like apparatus having its inner portion mounted on the vehicle and extending laterally outwardly from a side of the vehicle and disposed to gather, raise and discharge fruit lying in the path of said conveyor apparatus,
   c. a laterally directed conveyor extending past the outer end of the conveyor apparatus and dimensioned to pass beneath the overhanging limbs of the fruit trees as the vehicle moves along the row and to move fruit in the path thereof laterally inwardly into the path of the gathering and elevating means,
   d. apparatus carried on the vehicle and located to receive the fruit from said gathering and elevating means and place it in a receptacle, and
   e. apparatus carried on the vehicle to discharge said receptacle laterally of the path of movement of the apparatus along the row and clear of the apparatus, permitting gathering of the fruit, filling a receptacle therewith and discharging the receptacle without interrupting forward motion of the apparatus.

10. Apparatus as defined in claim 9 in which said vehicle is equipped on each side with said fruit gathering and elevating means and said laterally directed conveyors, whereby upon a single pass along a row fruit is gathered from beneath the adjacent sides of adjacent rows of trees.

11. Apparatus as defined in claim 9 in which said laterally directed conveyor is provided with means permitting it to move away from obstructions lying in the path of said conveyor, thus to prevent damage to the same.

12. Apparatus as defined in claim 11 in which the laterally directed conveyor is pivotally mounted adjacent the outer ends of the fruit gathering and elevating means in such fashion that its outer end may pivot rearwardly of the path of movement of the apparatus when said conveyor engages an obstruction, and means biasing the other end of said conveyor toward the direction of movement of the apparatus as a whole.

13. Apparatus as defined in claim 11 in which the laterally directed conveyor is mounted for reciprocation relative to the fruit gathering and elevating means, and means to move said conveyor inwardly upon engagement by it of an obstruction.

14. Apparatus as defined in claim 13 in which there is means to adjust the outer extended position of said laterally extending conveyor, thus to accommodate the apparatus to different width rows.

15. Apparatus as defined in claim 9 in which said fruit gathering and elevating means is pivotally mounted on said vehicle for folding alongside the vehicle, thus to decrease the overall width of the apparatus for transport along a road.

16. Apparatus as defined in claim 9 in which said fruit gathering and elevating means is mounted on the vehicle for vertical adjustment, thus to accommodate the same to differences in terrain, size of fruit, etc.

17. Apparatus as defined in claim 9 in which said vehicle is equipped with a forwardly located laterally directed fruit engaging conveyor disposed to move fruit lying on the ground along the central path of movement of the vehicle into the path of said fruit gathering and elevating means.

* * * * *